Patented Sept. 11, 1923.

1,467,984

UNITED STATES PATENT OFFICE.

CLAYTON OLIN NORTH, OF TALLMADGE, OHIO.

EMPLOYING DERIVATIVES OF THE CONDENSATION PRODUCTS OF AMINES AND ALDEHYDES IN THE VULCANIZATION OF RUBBER.

No Drawing. Application filed March 24, 1923. Serial No. 627,328.

*To all whom it may concern:*

Be it known that I, CLAYTON OLIN NORTH, a citizen of the United States, and a resident of the township of Tallmadge, county of Summit, and State of Ohio, have invented certain new and useful Improvements in Employing Derivatives of the Condensation Products of Amines and Aldehydes in the Vulcanization of Rubber, of which the following is a specification.

The invention relates to the vulcanization of rubber or similar materials, such as gutta percha, balata and rubber substitutes. It is more particularly directed to the vulcanization of natural rubber employing derivatives, and preferably the aldehyde derivatives of the condensation products of primary amines and aldehydes, that is, the aldehyde derivatives of Schiff's bases. Furthermore, my invention is specially directed to the use as accelerators of the vulcanization of rubber of the aldehyde derivatives of dehydrated di-molecular ethylidene aniline.

It is also an object of this invention to provide a process for the vulcanization of rubber involving the use of a material which shall require a shorter time of cure for the quantity of accelerator usually employed for the purpose. Furthermore it is also an object of the invention to provide a process using a compound of the type mentioned which will not cause overvulcanization as readily as do other accelerators well known in the art, but which will produce a finished vulcanized product possessing a maximum tensile strength throughout a wide range of curing conditions.

It is also an object of my invention to provide a material for use as an accelerator of the vulcanization of rubber stocks, intended for and usable in the manufacture of soft rubber, hard rubber, tube compound, tread or cushion tire stock as well as for the production of many other types of compounds as are readily apparent to one skilled in the art.

The use of the simple mono-molecular condensation products of aldehydes and amines and especially of aliphatic aldehydes and aromatic amines has for some time been known in the art of vulcanizing rubber, as has been disclosed in British Patent 7370 of 1914 to Peachy, in French Patent 470,833 to Bastide and more recently in United States Patent 1,417,970 to Cadwell. The simple mono-molecular condensation products of aldehydes and amines, as well as the dehydrated di-molecular ethylidene aniline are all relatively soft and sticky materials, but as a class are good accelerating agents. My product, prepared according to the method disclosed in my co-pending application Serial No. 627,326, filed of even date, is also a comparatively soft material but it is especially adapted for use in a rubber mix, and produces a vulcanized rubber having excellent wearing qualities and one which ages most remarkably. The class of compounds which I prefer to use as accelerators of the vulcanization of rubber is the aldehyde derivative of the dehydrated polymerized condensation product of an aldehyde and an amine which may be prepared, by passing the vapors of an aldehyde, and preferably acetaldehyde, into an amine, preferably aniline, until the reacting mass heats up and begins to cool down, whereby a simple condensation of the reacting materials and a polymerization probably into a di-molecular compound accompanied by a more or less complete dehydration of the product takes place. The passage of the current of aldehyde vapor is continued through the mass which is kept at a temperature of approximately 100° C. for a period of about 12 hours, by means of steam heated coils in the container, and is then allowed to cool slowly during a period of 5 to 6 hours to a temperature of 50° to 60° C. whereupon a further reaction takes place between the aldehyde and the polymerized condensation product. This reaction with aldehyde may take place in a number of stages and produce a series of compounds but I have found, as pointed out in my before mentioned co-pending application, that when vapors of aldehyde are passed through aniline contained in three tanks connected in series, and the passage of aldehyde vapor is continued through the first tank after the main condensation reaction has taken place therein and on into the second tank until its contents in turn have warmed up from the heat developed by the reaction and have commenced to cool down as the reaction subsides, that the sum total of the reactions taking place in the first tank may be represented most simply by a schematic relationship in which three molecular equivalents of aldehyde have chemically combined with two molecular equivalents of the amine. The material so formed is dehydrated at a temperature not exceeding 105° C. until the moisture content of the product is no greater then 2%. The material so obtained in the case of aniline and acetaldehyde, I have chosen to call the acetaldeyhde reaction product of dehydrated polymerized ethylidene aniline and it is formed, as shown, by the condensation, polymerization, and union of two molecular equivalents of aniline with three molecular equivalents of acetaldehyde. The various reactions taking place in the process as set forth may be represented as follows:

In the first stage of the reaction, the well known Schiff's base is formed:

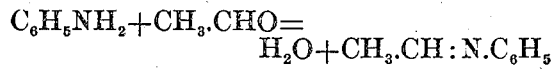
$$C_6H_5NH_2+CH_3.CHO= H_2O+CH_3.CH:N.C_6H_5$$

This compound then polymerizes to the di-molecular form—a change which may be most conveniently shown by representing the complete reaction in the following form:

$$2C_6H_5NH_2+2CH_3.CHO=2H_2O+C_{16}H_{18}N_2$$

Under the temperature conditions prevailing, a more or less complete dehydration of the product takes place and I have found that the extent to which additional aldehyde will react with this polymerized condensation product, depends upon the completeness of the dehydration process. Other compounds produced by this reaction are covered by my copending applications, Serial Numbers 627,326; 627,327 and 627,325, all filed of even date.

If the process set forth in this application be followed, I have found that more aldehyde will react with the polymerized dehydrated condensation product as follows:

$$C_{16}H_{18}N_2+CH_3.CHO=H_2O+C_{18}H_{20}N_2$$

The total changes taking place in my preferred process may then be represented as follows:

$$3CH_3CHO+2C_6H_5NH_2=3H_2O+C_{18}H_{20}N_2$$

It is this product which I term the aldehyde reaction product of dehydrated polymerized ethylidene aniline and which I have found to be an excellent accelerator of the vulcanization of rubber as is fully set forth in the examples following.

The method whereby the value of any given rubber mix is ascertained is most conveniently and quickly carried out by determining the tensile strength of samples of the product, vulcanized under constant temperature conditions throughout any given period of time. In practice, that sample possessing the maximum tensile strength, other things being equal, is generally considered as having been cured at the optimum cure for that particular composition or proportion of ingredients. I have found by using my new class of compounds as accelerators of vulcanization that a maximum tensile strength is quickly developed in the stock, and that, in contrast to the results usually obtained, this maximum value decreases but slowly over a relatively long period of time. This means, that by the use of my preferred type of accelerator, there is not the great danger of producing an over-cure of the article being vulcanized, and consequently, that the ageing qualities of the finished product are very greatly improved in service. The advantages of this are obvious.

The following examples are given as typical of the wide range of usefulness of my preferred class of compounds as accelerators. If 100 parts of rubber, for example, the grade known to the trade as smoked sheet, 5 parts of zinc oxide, 3.5 parts of sulfur and 1 part of accelerator (for example, the acetaldehyde derivative of dehydrated polymerized ethylidene aniline), are mixed together by milling on rolls in the usual manner, and then vulcanized in a press under 40 pounds steam pressure, a good commercial cure results in 20 minutes. The product has a tensile strength of about 2900 pounds per square inch and shows the long flat curing curve, characteristic of stocks cured by the use of this class of accelerator.

An excellent hard rubber may be obtained by mixing in the usual manner 100 parts smoked sheet rubber, 10 parts zinc oxide, .5 parts of lime, 40 parts of sulfur and 2 parts of my preferred type of accelerator, for example the acetaldehyde derivative of dehydrated polymerized ethylidene aniline. When this mixture is vulcanized, in a press under 90 pounds steam pressure, a good cure is obtained in 15 minutes to one half hour.

Other fillers or compounding materials may also be used successfully with my material. For example, if 55 parts of smoked sheet rubber, 30 parts of carbon black, 2 parts of sulfur, 1 part of hardwood pitch, 11.25 parts of zinc oxide and 0.75 parts of the acetaldehyde derivative of dehydrated, polymerized ethylidene aniline are mixed together, and cured, I obtain a vulcanized product having properties that make it valuable for use as a tread stock for tires. The tensile strength of this product remains comparatively constant at from 3300 to 3600 pounds per square inch when cured from 1 to 3 hours at 40 pounds steam pressure.

Although I have specifically mentioned the acetaldehyde derivative of dehydrated polymerized ethylidene aniline in the examples given, it is to be understood that my invention is not limited to the use of this one compound only, but that other aldehyde derivatives of the condensation products of other aldehydes and amines may be used.

In general my invention includes as accelerators all compounds of the type disclosed, that can be obtained by means of the process claimed in my co-pending application previously referred to, but specifically my invention embodies the use as accelerators of vulcanization of the aldehyde derivatives of the polymerized condensation products of aliphatic aldehydes and primary aromatic amines. Compounds whose accelerating properties would come within the scope of my invention would be the formaldehyde, acetaldehyde, propionaldehyde, butaldehyde, etc., derivatives of the condensation products of any of these same aldehydes with aniline, the toluidines, the xylidenes, or of any combination of any of these substances. Particularly do I refer, as I have previously pointed out, to the accelerating properties of the aldehyde derivatives of the dehydrated and polymerized condensation products of these same substances.

My preferred class of accelerators of the vulcanization of rubber, when used in the manner as set forth in the examples given, or in the ways apparent to one skilled in the art of rubber compounding, yield, after vulcanization, compounds possessing especially desirable properties, as herein described, which compounds are of higher quality, and possess more desirable ageing characteristics than is shown by goods cured by means of the simple aldehyde-amine reaction products previously used in the art. Indeed, the curing power of the acetaldehyde derivative of dehydrated polymerized ethylidene aniline is somewhat superior to ethylidene aniline itself.

It is understood that my invention is not limited by any theories advanced by way of explanation, and is not dependent on the soundness or accuracy of such theories. My invention is limited solely by the following claims, which define my invention, and in which I intend to claim all novelty permissible in view of the prior art.

What I claim is:—

1. A process of treating rubber which comprises combining rubber with a vulcanizing agent and an aldehyde derivative of the condensation product of an aldehyde and amine, and vulcanizing the rubber mix.

2. A process of treating rubber which comprises combining rubber with a vulcanizing agent and an aldehyde derivative of the polymerized condensation product of an aldehyde and amine and vulcanizing the rubber mix.

3. A process of treating rubber which comprises combining rubber with a vulcanizing agent and an aldehyde derivative of the condensation product of an aliphatic aldehyde and an aromatic amine, and vulcanizing the rubber mix.

4. The process of treating rubber which comprises combining rubber with a vulcanizing agent and an aldehyde derivative of the condensation product of acetaldehyde and aniline and vulcanizing the rubber mix.

5. A process of treating rubber which comprises combining rubber with a vulcanizing agent and the acetaldehyde derivative of dehydrated di-molecular ethylidene aniline, and vulcanizing the rubber mix.

6. A rubber product derived from rubber combined with the aldehyde derivative of a condensation product of an aldehyde and amine, and vulcanized.

7. A rubber product derived from rubber combined with the aldehyde derivative of a condensation product of an aliphatic aldehyde and aromatic amine and vulcanized.

8. A rubber product derived from rubber combined with the aldehyde derivative of a polymerized condensation product of an aldehyde and amine and vulcanized.

9. A rubber product derived from rubber combined with the aldehyde derivative of the condensation product of acetaldehyde and aniline and vulcanized.

10. A rubber product derived from rubber, combined with the acetaldehyde derivative of dehydrated di-molecular ethylidene aniline, and vulcanized.

11. A process of treating rubber which comprises combining rubber with a vulcanizing agent, and with a compound formed by the union of three molecular proportions of acetaldehyde, and two molecular proportions of aniline, and vulcanizing the rubber mix.

12. A rubber product derived from rubber combined with a vulcanizing agent, and with a compound formed by the union of three molecular proportions of acetaldehyde, and two molecular proportions of aniline.

13. The process of treating rubber which comprises combining rubber with a vulcanizing agent and an aldehyde derivative of a Schiff's base and vulcanizing the rubber mix.

14. The process of treating rubber which comprises combining rubber with a vulcanizing agent and the acetaldehyde derivative of the Schiff's base obtained by the interaction of aniline with acetaldehyde and vulcanizing the rubber mix.

CLAYTON OLIN NORTH.